US006542624B1

(12) United States Patent
Oda (10) Patent No.: US 6,542,624 B1
(45) Date of Patent: Apr. 1, 2003

(54) IRIS CODE GENERATING DEVICE AND IRIS IDENTIFYING SYSTEM

(75) Inventor: Takahiro Oda, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/354,169

(22) Filed: Jul. 16, 1999

(30) Foreign Application Priority Data

Jul. 17, 1998 (JP) .......................................... 10-203468

(51) Int. Cl.[7] .............................. G06K 9/36; G06K 9/62; G06K 9/80
(52) U.S. Cl. ...................................................... 382/117
(58) Field of Search ................................ 382/115, 116, 382/117, 118, 312; 356/71; 340/5.53, 5.83; 348/78, 161; 706/6; 713/186, 200; 902/3, 6

(56) References Cited

U.S. PATENT DOCUMENTS

| 4,641,349 A | | 2/1987 | Flom et al. ..................... 382/2 |
| 4,717,952 A | | 1/1988 | Kohayakawa et al. ........ 358/113 |
| 5,187,506 A | * | 2/1993 | Carter ............................ 351/221 |
| 5,291,560 A | | 3/1994 | Daugman ........................ 382/2 |
| 5,572,596 A | | 11/1996 | Wildes et al. ................ 382/117 |
| 5,933,502 A | * | 8/1999 | Aucsmith et al. .............. 380/23 |

FOREIGN PATENT DOCUMENTS

| JP | 63-132633 | 6/1988 | ............. A61B/5/04 |
| JP | 63-282579 | 11/1988 | ............. G06F/15/62 |
| JP | 10-137220 | 5/1998 | ............. A61B/5/117 |
| WO | WO 9746979 A1 * | 12/1997 | ............. G07C/9/00 |

* cited by examiner

Primary Examiner—Brian Werner
(74) Attorney, Agent, or Firm—Venable; Robert J. Frank; Chad C. Anderson (57) ABSTRACT

The object of the present invention is to provide an iris code generating device and iris identifying system capable of sensing when a third party is pretending to be another person and capable of preventing crimes before they happen.

In order to achieve the aforementioned object, the present invention photographs an eye of a subject while causing biogenic reactions to occur in the eye of the subject an determines whether or not the biogenic responses happen as intended from the photographed image of an eye. In this way the present invention determines whether or not the image of an eye is a living thing and determines whether or not the structural components of the system such as photographing means and image processing means etc. are genuine.

10 Claims, 10 Drawing Sheets

IRIS CODE GENERATING DEVICE AND IRIS IDENTIFYING SYSTEM

BACKGROUND OF THE INVENTION

1. Field of the Invention

The present invention relates to an iris code generating device for generating an iris code and an iris identifying system for identifying individuals based on the iris code using the iris code generating device.

2. Description of the Related Art

An iris code is data in digital form for a pattern (hereinafter referred to as "iris pattern") of an iris in an eye. An iris code has remarkably different characteristics for each individual and can therefore be utilized in an iris identification system for identifying an individual.

This iris identifying system is utilized, for example, in a managed room access system for managing which people are allowed to enter or exit a room that identifies whether people entering or exiting a room are permitted to enter or exit the room.

It is anticipated that this iris identifying system will be utilized in the future in information communication systems for managing people's access to networks such as the internet and for identifying whether or not a person accessing a network has the appropriate privileges to partake in services such as electronic settlements and electronic authentication.

The following is a description using the drawings of the configuration of a related iris identification system. In the following description, a person that is permitted to enter or leave a room or a person who has the appropriate privileges to partake in services is referred to as the "authorized person". A person subjected to identification as to whether or not this person is the authorized person is referred to as a "subject".

Figure 10:
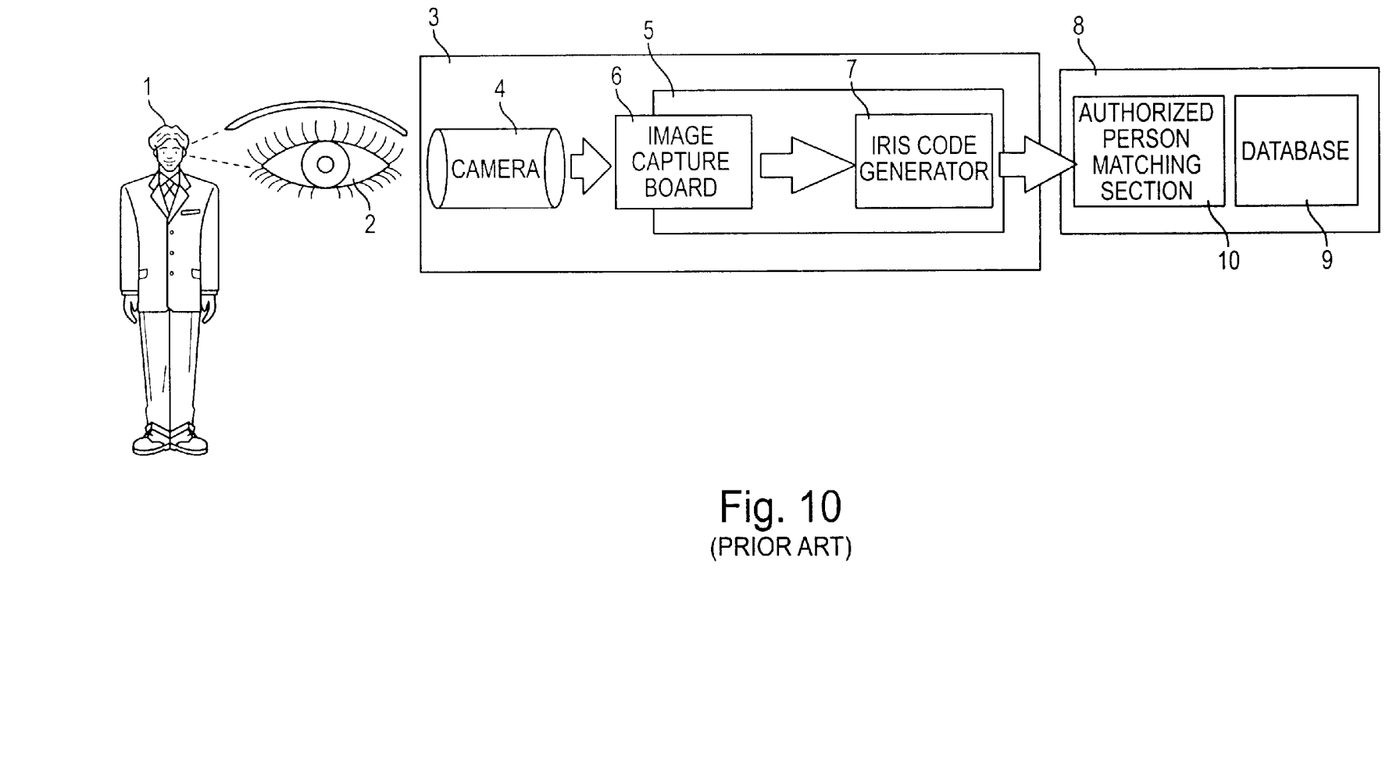
FIG. 10 is a view showing the configuration of a related iris identifying system.

FIG. 10 is a view showing the configuration of a related iris identifying system. In FIG. 10, numeral 3 indicates an iris code generating device and numeral 8 indicates a host computer (hereinafter referred to as "HOST").

The iris code generating device 3 is comprised of a camera 4 for photographing an image 2 of an eye of a person 1 and a personal computer (hereinafter referred to as "PC") 5. The PC 5 is comprised of an image capture board 6 for enlarging the image 2 of an eye photographed by the camera 4 and extracting an iris pattern from the image 2 of an eye and an iris code generator 7 for generating an iris code from an iris pattern.

The HOST 8 comprises a database 9 for storing data relating to people (for example, name, date of birth, etc.) and an authorized person matching section 10 for matching an iris code generated from the image 2 of an eye photographed by a camera 4 and an iris code stored on the database 9 and identifying whether or not the person 1 is the authorized person. The HOST 8 can also be modified to identify who the person is.

People with ill intentions are inclined to break into the iris identification system using some kind of illegal means. This kind of third party can consider, for example, stealing another person's iris code and breaking into the system using this stolen code. A third party may also consider forging another persons iris code and try to break into the system using the forged iris code. A third party may also obtain a detailed image of an eye of another person and consider breaking into the system using the obtained image.

Another possibility is that a third party may exchange structural components of the system (for example, the camera 4 or the image capture board 6, etc.) with an illegal device and attempt to break into the system by inputting false iris codes or false data into the system from the illegal device. The third party may consider connecting the illegal device to some point of the system so as to break into the system by inputting false iris codes or false data into the system from the illegal device. When a third party breaks into the system by these illegal means pretending to be another person the third party will appear to be the other person and a variety of crimes (including inappropriate deeds not yet defined in law as being illegal) can be carried out.

SUMMARY OF THE INVENTION

The object of the present invention is to provide an iris code generating device and an iris identifying system capable of detecting an intrusion into the system by illegal means and capable of preventing crimes from being committed.

In order to achieve this object, an iris code generating device of the present invention comprises a camera for photographing an image of an eye, an iris image processor for generating an iris code from an image of an eye photographed by the camera, a stimulation unit for causing a biogenic response in an eye of a subject and an authenticity determination processor for determining whether or not the image of an eye photographed by the camera is for a living thing in accordance with the biogenic response caused by the stimulation unit.

Further, the camera for photographing an image of an eye comprises a camera for photographing an image of an eye, an iris image processor for generating an iris code from an image of an eye photographed by the camera, a stimulation unit for causing a biogenic response in an eye of a subject and an authenticity determination processor for determining whether or not structural components of the system are authentic (for example, the camera and iris image processor, etc.) in accordance with the biogenic response caused by the stimulation unit.

The stimulation unit can comprise a light source for generating visible light and a light source for generating near infrared light. The stimulation unit can also comprise a plurality of light sources for generating near infrared light arranged around the periphery of a light source for generating visible light in such a manner that the light source for generating visible light is at the center of the light sources for generating near infrared light. In this configuration, the light source generating visible light is positioned opposite the center of the pupil of the subject and the plurality of light sources for generating near infrared light are positioned opposite the iris pattern at the periphery of the pupil. The intention of this configuration is that by adjusting the line of sight of the visible light that the subject can see, the visible light source will face the center of the pupil and the plurality of near infrared light sources will face the region at the periphery of the pupil. As a result of adopting this configuration for the stimulation section, the iris code generating device can photograph an image where the near infrared light and the iris pattern do not overlap and a superior iris code can therefore be generated.

The authenticity determination processor is configured so as to determine whether or not the image of an eye photographed by the camera 4 is for a living thing based on the position of light from the plurality of light sources for generating the infrared light depicted in the image of the eye. Alternatively, the authenticity determination processor determines whether or not the structural components of the system (for example, the camera and the iris image processor etc.) are authentic based on the position of light from the plurality of light sources generating infrared light depicted in the image of an eye.

The iris identifying system of the present invention has an iris code generating device and a database for storing iris codes of individuals and identifies individuals by matching an iris code generated by the iris code generating device and an iris code stored in the database.

The present invention can determine whether or not the image of an eye photographed by the camera is a living body. The present invention can also determine whether or not structural components of the system (for example, the camera and iris image processor etc.) are authentic. The present invention can therefore detect when the system is being broken into by illegal means and can prevent crimes from happening.

DETAILED DESCRIPTION OF THE PREFERRED EMBODIMENT

The following is a description using the drawings of the preferred embodiment of the present invention. Elements that are common to each of the drawings are given the same numerals. In the following description the iris identifying system is referred to as the "system" and the person to be identified is referred to as the "subject".

The eye of a living thing exhibits various biogenic responses. Examples of five typical responses are shown below.

(1) Contraction of pupil diameter.
(2) Reflection of light by the pupil.
(3) Movement of the pupil.
(4) Movement of the eyeball.
(5) Movement of the eyelashes.

The present invention determines the authenticity (whether or not the image of the eye is for a currently living thing) of images of eyes inputted to the system and determines authenticity of structural components of the system (whether or not the structural components of the system are authentic) by intentionally causing biogenic reactions in the eye of the subject.

The present invention is realized when a system is configured, for example, as follows.

The system has means (referred to in the following as a "stimulation unit") for causing biogenic reactions in the eye of the subject. This stimulation unit operates in a predecided pattern depending on a randomly generated life check code (described later). The system causes the stimulation unit to operate using this life check code and the subject's eye is photographed at this time by the camera. The system then verifies whether or not the photographed image of the eye exhibits biogenic responses based on the life check code.

When an image of an eye is inputted in real time using a camera with the subject being in front of the camera with the system configured in this manner, an image of an eye exhibiting biogenic characteristics can be inputted based on the life check code. However, when an image for an eye is inputted using the camera in real time but the subject is not in front of the camera, an image of an eye exhibiting biogenic responses cannot be inputted based on the life check code. The system is therefore capable of determining the authenticity of an image of an eye inputted into the system.

The system is configured in such a manner as to verify whether or not the time from causing the stimulation unit to operate until the image of an eye of the subject is photographed is within a prescribed time and to verify whether or not the time until an iris code is generated from the photographed image is within a prescribed time.

With the system configured in this manner, when the structural components of the system are authentic, an image of an eye exhibiting biogenic responses can be inputted and image processed within a prescribed period of time based on the life check code but when structural components of the system are illegal or illegal devices are connected to the system, inputting and image processing of an image of an eye exhibiting biogenic responses based on the life check code cannot be achieved. The system can therefore determine the authenticity of the structural components of the system.

The system can generate the life check code in such a manner that the eye of the subject is photographed a preset number of times, with verification being carried out on the consecutively photographed images of an eye.

"The Stimulation Unit"

A description is given regarding the stimulation unit based on an example utilizing two of the aforementioned biogenic reactions of, for example, 1 (contraction of the diameter of the pupil) and 2 (reflection of light by the pupil). In addition to the following example, this stimulation unit can also be configured so as to, for example, display an image for the subject to look at with this image moving from the right to the left so as to guide the line of sight of the subject and cause the eyeball of the subject to move. The stimulation unit can also be configured to blow wind into the eye of the subject so as to cause the eyelids of the subject to move. These kinds of situations are also included in the present invention.

Figure 1:
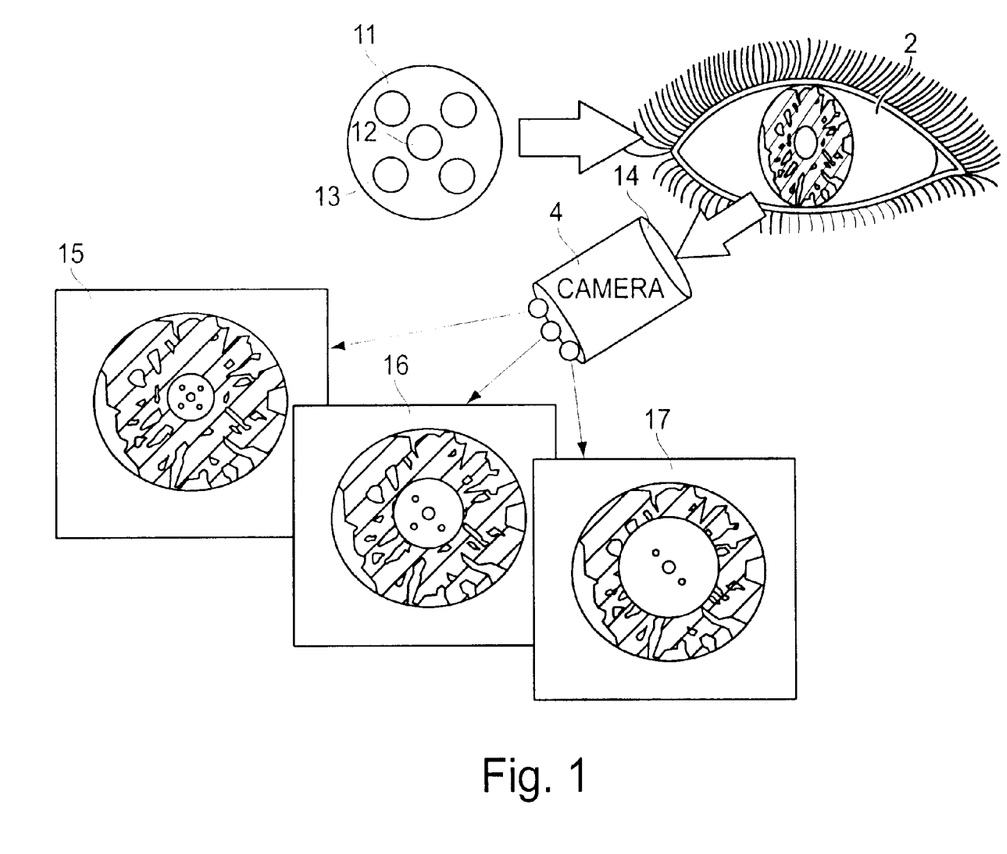
FIG. 1 is a view showing the theory of the stimulation unit of the present invention.

FIG. 1 is a view showing the theory of how the stimulation unit 11 evokes a reaction in the eye of the subject. The stimulation unit 11 includes a light source (referred to hereafter as a "visible light source") 12 for generating visible light (light of a wavelength of 400 nm to 700 nm) at the center thereof. A plurality (in this embodiment, four) of light sources (hereinafter referred to as "near infrared light sources") 13 for generating near infrared light (light of a wavelength of 700 nm to 1000 nm) are provided at the periphery of the stimulation unit 11. This stimulation unit 11 is arranged in such a manner as to shine visible light and near infrared light upon an eye of a subject.

Numeral 4 indicates a camera for photographing an eye 2 of a subject.

Numeral 14 indicates visible light-blocking glass attached to the lens of a camera 4. The visible light-blocking glass 14 blocks-out visible light and allows near infrared light to pass. When the camera 4 photographs the eye 2 without the visible light-blocking glass 14 attached, light from the visible light source 12 shines onto the eye 2 and part of the iris pattern becomes hidden. However, when the eye 2 is photographed with the visible light-blocking glass 14 attached, an image can be taken without part of the iris pattern becoming hidden.

Numerals 15 to 17 indicate images of the eye 2 of a subject photographed with the stimulation unit 11 operating under the following conditions.

Numeral 15 indicates an image taken with the four near infrared light sources 13 on so that the amount of light from the visible light source 12 is at a maximum. Here, the diameter of the pupil is at a minimum because the amount of light from the visible light source 12 is at a maximum and light from four light sources is reflected at the surface of the pupil because four of the near infrared light sources 13 are on.

Numeral 16 indicates an image taken with three of the near infrared light sources 13 on so as to give a medium amount of light from the visible light source 12. Here, the diameter of the pupil is of an intermediate size because there is a medium amount of light from the visible light source 12 and light from three light sources is reflected at the surface of the pupil because three of the near infrared light sources 13 are on. The amount of light from the visible light source 12 at this time is taken to be a preset value in such a manner that the diameter of the pupil at this time is midway between the diameter of the pupil with the amount of light from the visible light source 12 at a maximum and the diameter of the pupil with the amount of light from the visible light source 12 at a minimum.

Numeral 17 indicates an image photographed when two of the near infrared light sources 13 are on so as to give a minimum amount of light from the visible light source 12. Here, the diameter of the pupil is at a maximum because the amount of light from the visible light source 12 is at a minimum and the light from two light sources is reflected at the surface of the pupil because two of the near infrared light sources 13 are on.

As shown by the images 15 to 17, the diameter of the pupil of the eye 2 of the subject changes depending on the amount of light from the visible light source 12 and light from the near infrared light sources 13 is reflected at the surface of the pupil. In this embodiment, the diameter of the pupil can be made to change by controlling the amount of light from the visible light source 12 and the number of lights supplying light to the surface of the pupils can be changed by controlling the number of the near infrared light sources 13 that are turned on. In this way, the present embodiment can determine whether or not the image photographed for the eye 2 of the subject is a living thing. In the images 15 to 17 light is supplied from the visible light source 12 but in reality this light is blocked out by the visible light-blocking glass 14 attached to the camera 4.

This embodiment has the following benefits as a result of having the visible light source 12 and the near infrared light sources 13.

In this embodiment, biogenic reactions due to the light from the visible light source 12 and biogenic reactions due to light from the near infrared light sources 13 are made to occur independently from each other at the eye 2 of the subject. As a result, in this embodiment, for example, the diameter of the pupil can be changed without changing the number of lights reflected at the surface of the pupil and the number of lights reflected by the pupil can be changed without changing the diameter of the pupil. In this embodiment, a determination can be made as to whether or not the eye 2 of the subject undergoes a biogenic reaction in an anticipated manner by utilizing this theory and can determine whether or not the photographed image of the eye is for a currently living thing. Further, this embodiment can determine whether or not structural components of the system are authentic. In this embodiment, light from the near infrared light sources 13 collides with the iris. At this time, the iris pattern and the boundary between the iris and the pupil can be more distinctly extracted because the iris reflects the near infrared light more forcibly than the pupil. The present invention is therefore capable of taking superior images.

Methods for controlling the visible light source 12 and the near infrared light sources 13 are described in the following.

The visible light source 12 and the near infrared light sources 13 are controlled by a life check code described later. The life check code is data for controlling what amount of light is to be provided by illumination of the visible light source 12 and for controlling which light sources of the near infrared light sources 13 are to be illuminated. The number of life check pattern codes is given for each one exposure by multiplying a number of patterns for controlling the amount of light from the visible light source 12 and a number of patterns for controlling illumination of the near infrared light sources 13. In this embodiment, there are three patterns for controlling the amount of light from the visible light source 12 and two to the power of four patterns for controlling the illumination of the near infrared light sources 13, giving 48 patterns for the life check code. If, for example, photographing is carried out five times, the life check code is 48 to the power of 5, i.e. 254,803,968. The system then randomly generates one life check code from 254,803,968 and carries out appropriate encryption using an arbitrary means.

It is necessary to analyze the life check code because a third party is posing as another person. It is, however, difficult for the third party to decrypt the life check code because the life check code has undergone appropriate encryption.

Further, even if a third party can analyze the life check code by some means, it is necessary to take 48 images of the eye of another person without that other person being aware of this, or to provide a forgery. Further, it is extremely difficult to take 48 images of another persons eye without that person being aware of this. Even if 48 images of another persons eye are forged, it is necessary for the third party to verify that the forged 48 images of another person's eye match with the authorized person and this verification is difficult.

Even if a third party prepares 48 images of another persons eye, the system is monitoring the time until the images of the eye are inputted. It is therefore necessary for the third party to select images from the 48 images of another persons eye that match the life check code and input these images into the system in a similar period of time as the case where the subject inputs images of their own eye via the camera 4. However, it is extremely difficult for a third party to carry out inputting within this time. Moreover, the system randomly generates one life check code from 254,803,968. It is therefore extremely difficult for the third party to predict the life check code even if the third party attempts to input the image of an eye within a prescribed time by predicting the life check code beforehand and inputting the images of the eyes into the system in line with the timing of the life check code is also difficult.

It is therefore not possible for the third party to be another person.

"System Configuration"

Figure 2:
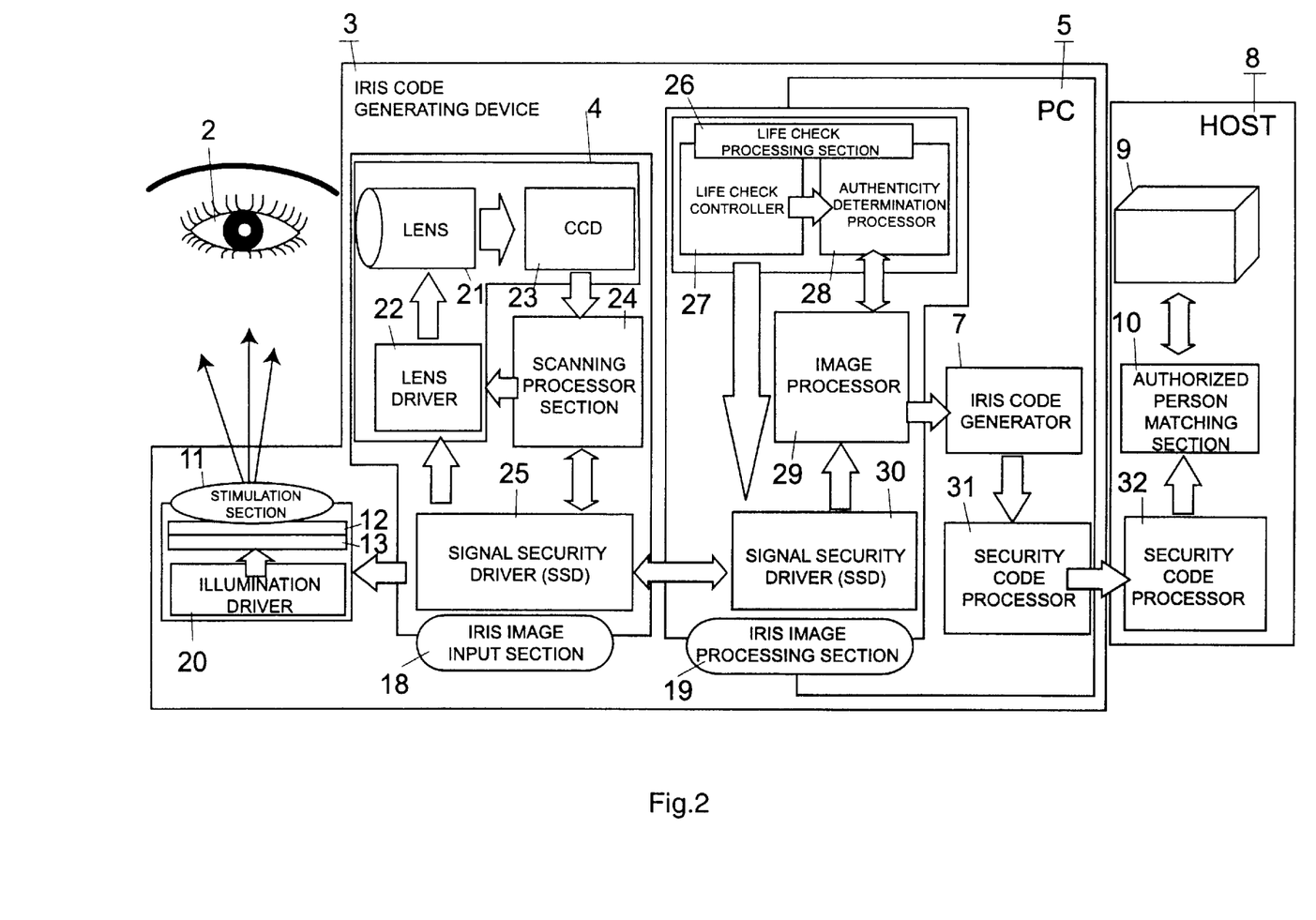
FIG. 2 is a view showing the configuration of the iris identifying system of the present invention.

FIG. 2 is a view showing the configuration of an iris identification system. Aspects of the configuration already described or described in the related are given the same numerals and descriptions thereof are omitted.

In FIG. 2, numeral 18 indicates an iris image input section and numeral 19 indicates an iris image processing section.

The configuration of the iris image input section 18 is as follows. The iris image input section 18 is comprised of the stimulation unit 11, an illumination driver 20, a lens 21, a lens driver 22, a CCD 23, a scanning processor section 24 and a signal security driver (hereinafter referred to as "SSD") 25.

The stimulation unit 11 is as described previously.

The illumination driver 20 controls illumination of each of the light sources of the stimulation unit 11 using the life check code.

The lens driver 22 controls the position of the lens 21 and the extent of opening of an iris using a signal from the CCD 23 and adjusts the focus of the image.

The scanning processor section 24 detects voltages (hereinafter referred to as "contrast voltages") outputted from each of the pixels of the CCD 23 in proportion to the contrast (intensity of light) of the image, composes an image based on the contrast voltages and temporarily stores the composed image (hereinafter referred to as "sampling"). The number of frames of the image sampled by the scanning processor section 24 is defined depending on the life check code. When images of the number of frames defined by the life check code are sampled, the scanning processor section 24 transmits each image to the iris image processing section 19 via the SSD 25 in frame units. The scanning processor section 24 can output the image independently for each pixel. The system encrypts the sampled image for transmission to the iris image processing section 19 in the following way utilizing this characteristic, i.e. the system includes data defining a method for reading the sampled message in the life check code and the scanning processor section 24 then acquires a method for reading the image from the life check code. For example, the scanning processor section 24 acquires whether the sampled image is to be read in a vertical, horizontal, or inclined direction from the life check code. Specifically, the scanning processor section 24 extracts data defining a method for reading an image from the life check code and divides this data by 3. When there is no remainder, the sampled image is read in a vertical direction, when the remainder is 1, the sampled image is read in a horizontal direction, and when the remainder is 2, the sampled image is read in an inclined direction. In this manner, the system encrypts the sampled image for sending to the iris image processing section 19.

The SSD 25 manages cables and data in such a manner that data such as iris image data and life check codes etc. going between the iris image input section 18 and the iris image processing section 19 cannot escape to the outside.

For example, before the transmission or receipt of data, the SSD 25 measures the inductance of the cable and then confirms that this value has not changed before transmitting or receiving data. The inductance of the cable changes when a bypass line is added to the cable. The SSD 25 can therefore determine whether or not a bypass line has been added to the cable by measuring the inductance of the cable.

The SSD 25 also encrypts the data so that the data cannot be deciphered by a third party. This encryption can be carried out using, for example, encryption theory such as the well-known RSA encryption techniques etc. or a message of reading the image as described above in relation to the scanning processor section 24 can also be used. This encryption can also be carried out by changing the order in which frames of a sampled image are sent by converting a third code value to be described later for the life check code into a base 10 value and determining whether or not this value N is an even number. The SSD 25 can therefore prevent a third party from appearing to be another person by encrypting the data in this way.

The iris image processing section 19 includes a life check processing section 26 incorporated at an image capture board 6 described in the related art. In this embodiment, the iris image processing section 19 is installed at a PC 5. The life check processing section 26 is comprised of a life check controller 27 for randomly generating a life check code, and an authenticity determination processor 28 for determining authenticity (whether or not an image is of a living thing) of an image of an eye inputted to the system and determining authenticity of structural components of the system (whether or structural component of the system is authentic).

The life check controller 27 randomly generates a life check code. This life check code is then supplied to the illumination driver 20. The illumination driver then lights each light source of the stimulation unit 11 based on this life check code. In this way, the eye of the subject is subjected to external stimulation in order to cause a biogenic reaction to occur.

The authenticity determination processor 28 receives 4the life check code from the life check controller 27 and receives image data, for the eye of the subject whose eye responded to external stimulus, from the iris image input section 18 based on this life checks code. The authenticity determination processor 28 then extracts characteristics for the biogenic reaction from this image and verifies whether or not the image is for a living thing using these characteristics. If characteristics for a reaction of a living thing are not present in the image, the authenticity determination processor 28 halts the process thereafter. If characteristics for the reaction of a living thing are present in the image, the extracted characteristics of a biogenic reaction are verified, based on the life check code, for contracting of the diameter of the pupil in order and whether or not the pupil reflects light, with the structural components (the stimulation section 11 and iris image input section 18) of the system also being verified for authenticity depending on this verification. Specifically, the authenticity determination processor 28 calculates the life check code from the extracted biogenic reaction characteristics, compares the calculated code and a life check code received beforehand from the life check controller 27 and identifies whether or not there is matching. If there is matching, the authenticity determination processor 28 determines the image of the eye to be authentic, determines that the stimulation section 11 and iris image input section 18 are authentic for the system and proceeds to carry out processing for matching to ensure that this person is the authorized person. If there is no matching, it is determined that the image of the eye is not authentic or that the stimulation section 11 and iris image input section 18 are not authentic for the system and processing thereafter is halted.

The iris image processing section 19 is comprised of an image processor 29 and an SSD 30.

The image processor 29 returns the order of the transmitted image for which the sampling order was changed by the SSD 25 back to the normal order and sends the image to the authenticity determination processor 28, obtains the results of an authenticity determination for the image determined at the authenticity determination processor 28 and sends the image to an iris code generator 7.

As with the SSD 25, the SSD 30 manages the cables and data in such a manner that data such as iris image data and life check data etc. does not leak to the outside between the iris image input section 18 and the iris image processing section 19.

This iris image processing section 19 is mounted on a PC 5 equipped with the iris code generator 7 and a security code processor 31 for arbitrating and encrypting signals inputted and outputted to and from a HOST 8. The PC 5 is connected via a communication line etc. to the HOST 8 equipped with a database 9, an authorized person matching section 10, and a security code processor 32 for arbitrating and encrypting signals inputted to and outputted from the iris image processing section 19.

The iris code generator 7 of the PC 5 generates iris codes from the iris images shown as images 15 to 17 of FIG. 1 sent from the image processor 29. In the iris image of this embodiment, portions that exhibit biogenic reactions are not on the iris pattern, so that an iris code can therefore be generated without hindrance.

The security code processor 31 encrypts the iris code using, for example an encryption code (public key). The iris code encrypted by the security code processor 31 is sent to the HOST 8, and is restored to its original state using a decryption code (secret key). As the decryption code is held by the HOST 8, a third party cannot decode the iris code even if the third party inputs an iris code and a security code encrypted for another person from the PC 5 because the third party cannot obtain the decryption code. A third party therefore cannot pretend to be another person.

Who is in possession of each of the structural components of the system is decided arbitrarily in line with the system conditions. For example, a configuration where a service provider is in possession of the entire system is likely. A configuration where a service provider is in possession of the stimulation unit 11, the iris image processing section 19, the PC 5 and the HOST 8 and the subject is in possession of just the iris image input section 18 is also possible. A configuration where the service provider is in possession of just the HOST 8 and the subject is in possession of the stimulation unit 11, the iris image input section 18, the iris image processing section 19 and the PC 5 is also possible.

It is also possible for the present invention to have a configuration where the iris image processing section 19, PC 5 and HOST 8 are integrally formed and authenticity of the image of an eye inputted by the subject and authenticity of the structural components of the system (the stimulation unit 11 and the iris image input section 18) are determined using a single life check processing section 26. The present invention also includes these kinds of configurations.

This embodiment utilizes the biogenic responses of contraction of the diameter of a pupil and the reflection of light by a pupil for the stimulation unit but it is also possible to utilize other biogenic reactions such as, for example, movement of a pupil, movement of an eyeball or movement of an eyelid, etc. The present invention includes utilization of these biogenic reactions.

Figure 7:
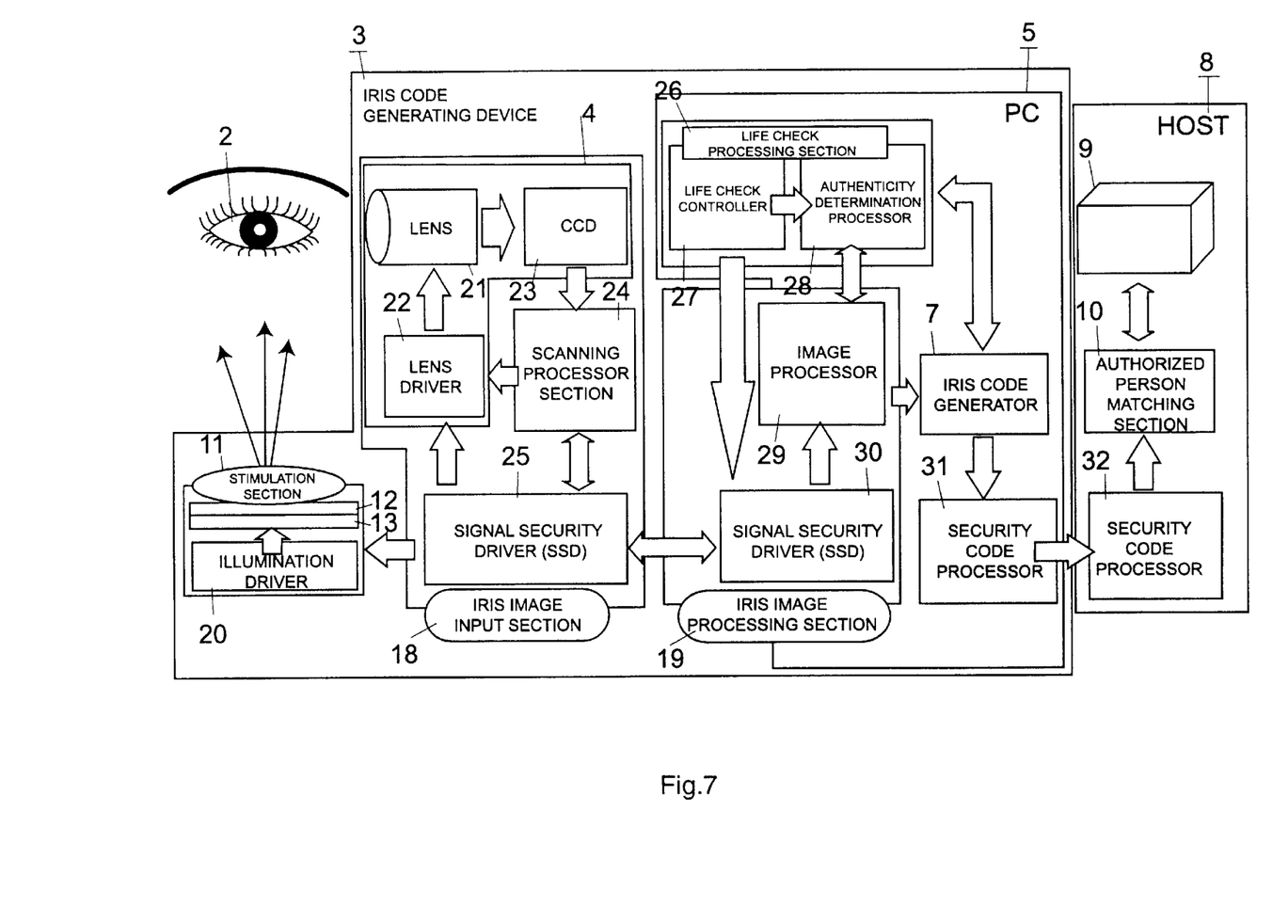
FIG. 7 is a view showing a further configuration of the iris identifying system of the present invention.

In this embodiment the life check processing section 26 can be moved from the iris image processing section 19 that is an image capture keyboard to the side of the PC 5, as shown in FIG. 7. FIG. 7 is a view showing a further configuration of an iris identification system.

In the embodiment of FIG. 7, the life check processing section 26 supplies a life check code from the life check controller 27 to the illumination driver 20 via SSD 30 and SSD 25 and each of the light sources of the stimulation unit 11 are illuminated. The life check processing section 26 obtains the image photographed at this time from the image processor 29 of the iris image processing section 19 and whether or not the acquired image is a living thing is verified by the authenticity determination processor 28, i.e. the authenticity determination processor 28 of the life check processing section 26 extracts characteristics of the biogenic response from the image and verifies whether or not the image is for a living thing using the presence or absence of these characteristics. The authenticity determination processor 28 halts processing thereafter if biogenic response characteristics are not present in the image. If biogenic response characteristics are present in the image, the authenticity determination processor 28 verifies contraction of the diameter of the pupil in order for the extracted biogenic response characteristics based on the life check code, verifies whether or not light is reflected by the pupil, and then verifies the authenticity of the system configuration components (stimulation unit 11 and iris image input section 18, and iris image processing section 19) as appropriate. Specifically, the authenticity determination processor 28 calculates the life check code from the extracted biogenic response characteristics, compares the calculated code and a life check code received from the life check controller 27 beforehand and identifies whether or not there is matching. If there is matching, the authenticity determination processor 28 determines the image of an eye to be authentic, determines that the stimulation unit 11, iris image input section 18 and iris image processing section 19 are authentic for the system and proceeds with matching processing to determine that the person is the genuine person. If there is no matching, it is determined that the image of an eye is not authentic or that the stimulation unit 11, iris image input section 18 and iris image processing section 19 are not authentic for the system and processing thereafter is halted.

"System Operation"

The subject lines up their eye with the lens 21 of the camera 4 and inputs an instruction designating the start of authorized person matching into the system from an input means (not shown).

The life check controller 27 of the life check processing section 26 then calculates the life check code and sends the same code to the iris image input section 18 via the SSD 30 and to the authenticity determination processor 28. In the following description the code at this time is referred to as the life check code IN. This code is used at the authenticity determination processor 28 in the following processing.

Next, the iris image input section 18 receives the same code via the SSD 25, deciphers this code and sends the code to the illumination driver 20. The illumination driver 20 then turns on each of the light sources of the stimulation unit 11 based on the life check code IN so as to subject the eye 2 of the subject to external stimulation. If the subject is in front of the camera 4 at this time, the eye 2 of the subject is caused to biogenically respond in the manner designated by the life check code IN but if the subject is not in front of the camera 4 (in the case of a third party pretending to be another person), the eye 2 of the subject does not biogenically respond in the manner designated by the life check code IN.

The iris image input section 18 photographs the eye 2 of the subject at a timing defined by the life check code IN, i.e.

the iris image input section 18 successively samples the image formed by the CCD pixels 23 in line with the timing of sampling defined by the latch check code IN and a timing defined by the latch code IN when the frame number is decrypted by the scanning processor section 24.

When a number of frames defined by the life check code IN is sampled, the iris image input section 18 puts the sampled image into the form of data using the SSD 25 (for example, rearranging the order of the images to be sent or encrypting the images to be sent) and this data is sent to the iris image processing section 19.

The iris image processing section 19 receives the image data via the SSD 30. The image processor 29 of the iris image processing section 19 deciphers the order of the rearranged images and rearranges the image data to the original order for sending to the authenticity determination processor 28.

The authenticity determination processor 28 extracts biogenic response characteristics from the image data and verifies whether or not the image is for a living thing depending on the existence of these characteristics. The authenticity determination processor 28 halts processing thereafter is biogenic response characteristics are not present in the image data. If biogenic response characteristics are present in the image data, the authenticity determination processor 28 verifies the extracted biogenic response characteristics to determine whether or not the diameter of the pupil contracts in order and whether the pupil reflects light, based on the life check code IN, and verifies whether or not the structural components of the system (the iris image input section 18 and the stimulation section 11) are authentic as appropriate. Specifically, the authenticity determination processor 28 calculates the life check code (hereinafter referred to as "life check code OUT") from the extracted biogenic response characteristics, compares the life check code OUT and the life check code IN received from the life check controller 27 beforehand and identifies whether or not there is matching. If the two life check codes match, the authenticity determination processor 28 determines that the image of an eye is authentic, determines that the iris image input section 18 and the stimulation section 11 are authentic for the system, and sends a signal to the image processor 29 indicating that processing is to continue. If the two life check codes do not match, the authenticity determination processor 28 determines that the image of an eye is not authentic or that the iris image input section 18 and the stimulation section 11 are not authentic for the system, and sends a signal indicating that processing is to be halted to the image processor 29.

When a signal indicating to continue processing is received from the authenticity determination processor 28, the image processor 29 sends the image data to the iris code generator 7. When a signal indicating to halt processing is received from the authenticity determination processor 28 a signal indicating halting of the processing is sent to the PC 5 and the HOST 8 via the iris code generator 7.

When image data is received from the image processor 29, the iris code generator 7 generates an iris code for the subject from the image data and the generated iris code is encrypted by the security code processor 31 and sent to the HOST 8. When a signal indicating to halt processing is received from the image processor 29, the iris code generator 7 sends a signal indicating to halt processing to the HOST 8.

When an iris code is received from the iris code generator 7 the HOST 8 decrypts the iris code using the security code processor 32 a comparison is made with an iris code stored in the database 9 by the authorized person matching section 10 and authorized person matching is carried out. The HOST 8 then sends the results to the PC 5. When a signal indicating to halt processing is received from the iris code generator 7, the HOST 8 temporarily halts the authorized person matching and notifies the service provider using notification means (not shown) depending on the case.

"The Authenticity Determination Processor"

The life check code relating to this embodiment includes, for example, a code (hereinafter referred to as "first code") for deciding the amount of light for the visible light source 12, a code (hereinafter referred to as "second code") for controlling illumination of the near infrared light sources 13, a code (hereinafter referred to as "third code") for deciding a number of frames to be sampled, a code (hereinafter referred to as "fourth code") for designating the order of transmission of the frames, and other arbitrarily decided data. The life check code is digital data, with the arrangement of this data being changed based on a predecided algorithm.

Figure 9:
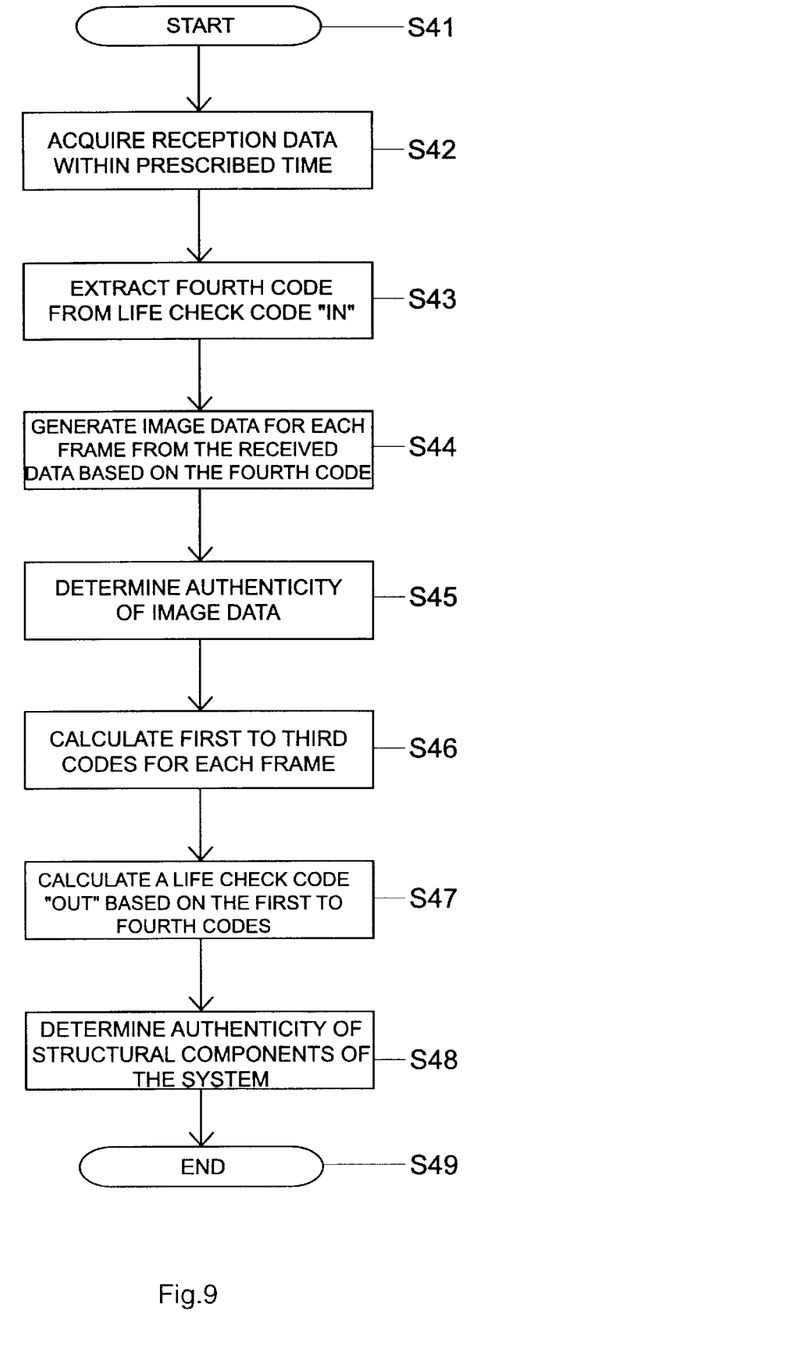
FIG. 9 is a flowchart showing the operation of the authenticity determination processor.

The authenticity determination processor 28 determines the authenticity of image data and the authenticity of the structural components of the system using the life check code in the manner shown in FIG. 9. FIG. 9 is a flowchart showing the operation of the authenticity determination processor 28.

First, the life check controller 27 generates a life check code IN and sends this life check code IN to the iris image input section 18 via the SSD 30 and to the authenticity determination processor 28. As a result, in step S41, the iris image input section 18 decrypts the life check code IN, the stimulation unit 11 is made to operate based on the deciphered life check code IN so that a biogenic reaction is caused in the eye 2 of the subject and operation of the authenticity determination processor 28 commences.

In step S42 the authenticity determination processor 28 measures the time from the life check code IN being acquired from the life check controller 27 until the data received from the iris image input section 18 is acquired. When this time is within a predefined prescribed time, the authenticity determination processor 28 proceeds to step S43 of the operation in order to proceed with processing thereafter. When this time is not within the predefined prescribed time, the authenticity determination processor 28 sends a signal indicating to halt processing thereafter to the HOST 8 via the image processor 29.

In step S43, the authenticity determination processor 28 extracts the fourth code from the life check code.

In step S44, the authenticity determination processor 28 generates image data for every frame from data received from the iris image input section 18 based on the fourth code.

In step S45, the authenticity determination processor 28 determines the authenticity of the image data, i.e. first, the authenticity determination processor 28 extracts data for the surroundings of the iris from the image data for each frame, generates an iris code and determines whether or not the iris codes for each frame match. When the iris codes for each frame match, the authenticity determination processor 28 determines whether or not data for the surroundings of the iris for each frame exhibits biogenic responses. When the data for the surroundings of the iris for each frame exhibits biogenic responses, the authenticity determination processor 28 determines whether or not the image data is for a living thing and processing is continued thereafter, i.e. authenticity of the structural components of the system is determined. When the iris codes for each frame do not coincide or when the iris codes for each frame coincide but the data for the surroundings of the iris for each frame does not exhibit biogenic responses, the authenticity determination processor 28 determines that the image data is not for a currently living body and a signal indicating to halt processing thereafter is sent to the HOST 8 via the image processor 29. When the iris codes for each frame coincide and data for the surroundings of the iris of each frame exhibits biogenic responses, the authenticity determination processor 28 advances the operation to step S46.

In step S46, the authenticity determination processor 28 carries out detection of a pupil outline, detection of pupil reflection points and frame number detection on image data for each frame and calculates first to third codes from the image data for each frame.

Detection of the pupil outline refers to the extraction of an outline showing the boundary of the pupil and the iris (hereinafter referred to as the "pupil outline") from the image data and measuring the size of the pupil outline. The size of the pupil outline corresponds to the amount of light from the visible light source 12 controlled by the first code. As a result, the authenticity determination processor 28 can obtain the first code by measuring the size of the pupil outline. The details of this pupil outline detection are described in detail later.

Detection of pupil reflection points refers to extracting reflection points (hereinafter referred to as "pupil reflection points") formed on the image by reflections at the pupil surface and measuring the number and position of the pupil reflection points. The pupil reflection points show the light sources of the illumination driver 20 that are turned on under the control of the second code. The second code can therefore be obtained by identifying the position of the light sources of the illumination driver 20 that are turned on. The details of the detection of pupil reflection points are described later.

Frame number detection refers to detecting of the number of frames sampled for an image. The number of frames is defined by the third code. The authenticity determination processor 28 can therefore obtain the third code by detecting the number of frames sampled for an image. Frame number detection is described in detail later.

In step S47, the authenticity determination processor 28 calculates life check codes OUT for each frame based on the first to third codes calculated from the image data for each frame and the fourth code extracted from the life check code IN.

In step S48, the authenticity determination processor 28 compares the life check code OUT and the life check code IN and determines the authenticity of the structural components of the system, i.e. the authenticity determination processor 28 determines that the structural components of the system are authentic when the life check code OUT and the life check code IN match and carries out processing thereafter. The authenticity determination processor 28 also determines that the structural components of the system are not authentic when the life check code OUT and the life check code IN do not match and sends a signal to stop processing thereafter to the HOST 8 via the image processor 29.

In step 49 the authenticity determination processor 28 finishes the operation.

"Regarding Detecting the Pupil Outline"

Figure 3:
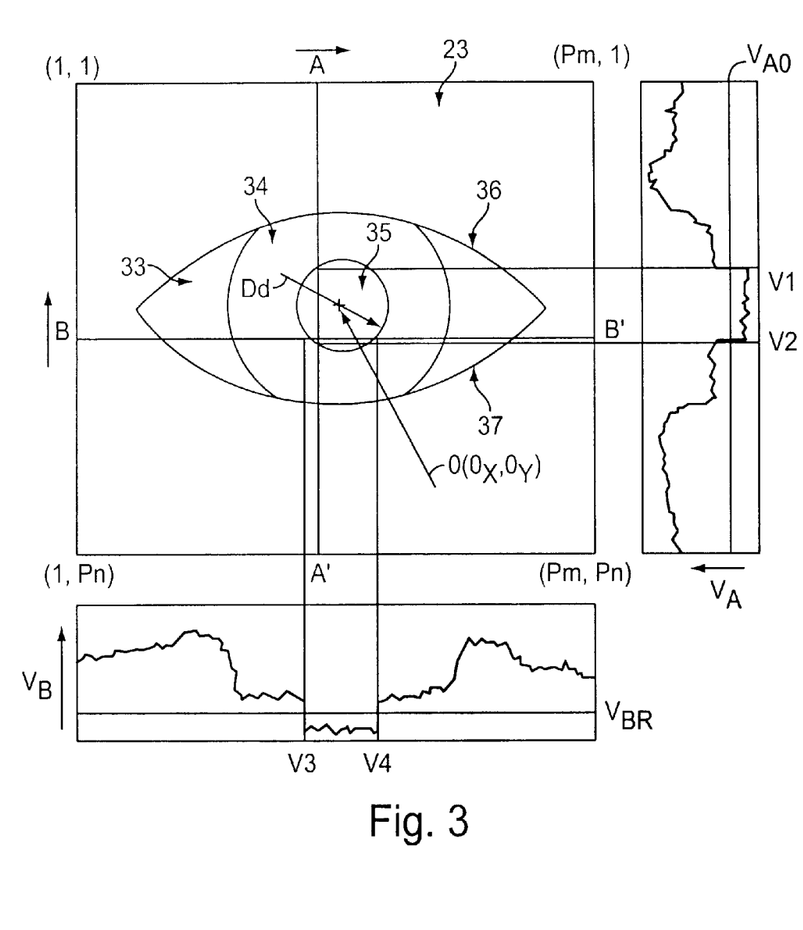
FIG. 3 is a view illustrating the theory of pupil outline detection.

FIG. 3 is a view illustrating the theory of pupil outline detection. FIG. 3 shows the relationship of the image of the eye of the subject formed on the surface of the CCD 23 and a contrast voltage obtained for the same image. The photographed image of an eye is arranged at the central portion of FIG. 3. A waveform for a contrast voltage VA outputted from pixels from the top of the line A–A' at the time of scanning the line A–A' in a direction from left to right of the image of the eye is arranged at the right portion of FIG. 3. Further, a waveform for a contract voltage VB outputted from pixels at the top of the line B–B' when scanning the line B–B' from the bottom of the image of the eye in an upward direction is arranged at the lower portion of FIG. 3.

In FIG. 3, numeral 33 indicates the white of the eye, numeral 34 indicates the iris, numeral 35 indicates the pupil, numeral 36 indicates the upper eyelid, numeral 37 indicates the lower eyelid, numeral 23 indicates a CCD, A–A' is a horizontally scanning line B–B' is a vertically scanning line, VA and VB are contrast voltages, VA0 and VB0 are contrast voltage threshold values, V1, V2, V3 and V4 are intersection points of the pupil outline, and O is the center of the pupil outline. The contrast distribution of the photographed image at the CCD 23 is brightest at the white of the eye 33, with the upper and lower eyelids 36 and 37, the iris 34 and the pupil 35 then following in order of brightness, i.e. the pupil is the darkest portion. The number of pixels comprising the CCD 23 of FIG. 3 is Pm in the horizontal direction and Pn in the vertical direction.

The size Dd of the pupil outline corresponds to the amount of light of the visible light source 12. The authenticity determination processor 28 can then obtain the first code by calculating the size Dd of the pupil outline as follows.

The authenticity determination processor 28 detects points V1 and V2 where the contrast voltage VA coincides with the threshold voltage VA0 and points V3 and V4 where the contrast voltage VB coincides with the threshold value VB0. These points are the boundary of the pupil and the iris and the authenticity determination processor 28 therefore sees portions where the contrast voltage VA is smaller than the threshold value VA0 and portions where the contrast voltage VB is smaller than the threshold value VB0 as the pupil. Next, the authenticity determination processor 28 scans the top of the image in the directions of the arrows along line A–A' and line B–B' and calculates the diameter of the pupil outline (i.e. the values where each line is at a maximum).

The authenticity determination processor 28 then classifies to what amount of light for the visible light source 12 the diameter of the pupil corresponds. The authenticity determination processor 28 possesses corresponding table data given to the amount of light of the visible light source 12 and the first code and generates a first code corresponding to the classified amount of light.

Figure 4:
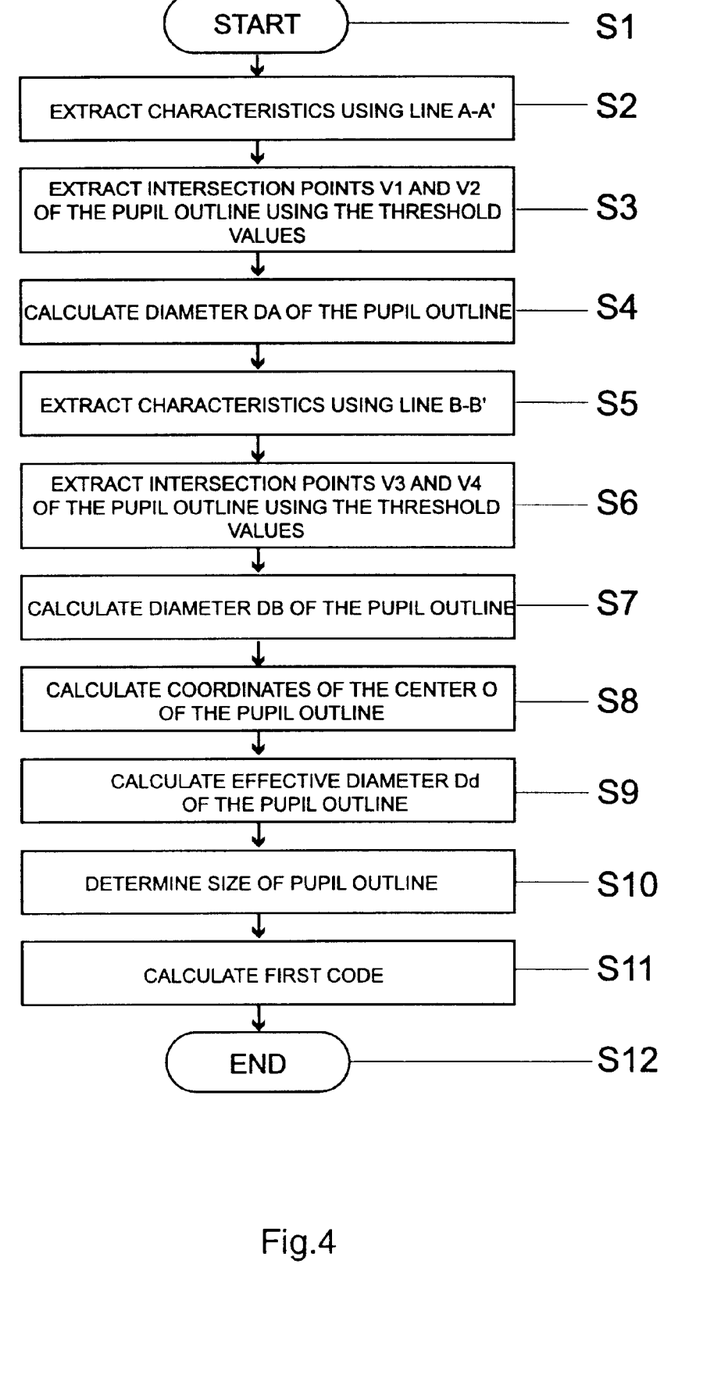
FIG. 4 is a flowchart relating to pupil outline detection.

FIG. 4 is a flowchart relating to the aforementioned pupil outline detection.

In step S1, the authenticity determination processor 28 receives image data for the eye of the subject from the image processor 29 and starts detection of the pupil outline.

In step S2, the authenticity determination processor 28 extracts the contrast waveform using the line A–A'.

In step S3, the authenticity determination processor 28 extracts the points of intersection V1 and V2 for the pupil outline using the threshold value VA0.

In step S4, the authenticity determination processor 28 obtains the distance between the intersection points V1 and V2 and calculates a diameter DA of the pupil outline.

In step S5, the authenticity determination processor 28 extracts a contrast waveform using the line B–B'.

In step S6, the authenticity determination processor 28 extracts the intersection points V3 and V4 of the pupil outline using the threshold value VB0.

In step S7, the authenticity determination processor 28 obtains the distance between the intersection points V3 and V4 and calculates a diameter DB of the pupil outline.

In step S8, the authenticity determination processor 28 calculates the coordinates of the center O of the pupil outline.

In step S9, the authenticity determination processor 28 calculates the diameter Dd of the pupil outline.

In step S10, the authenticity determination processor 28 classifies the size of the pupil outline into (one of) three stages.

In step S11, the authenticity determination processor 28 calculates the first code.

In step S12, the authenticity determination processor 28 ends the operation of detecting the pupil outline.

The authenticity determination processor 28 is capable of storing the position of each line when the line A–A' and the line B–B' are at maximums and is capable of calculating the coordinates (OX, OY) of the center of the pupil outline using these positions.

"Regarding the detection of the pupil reflection points"

Figure 5:
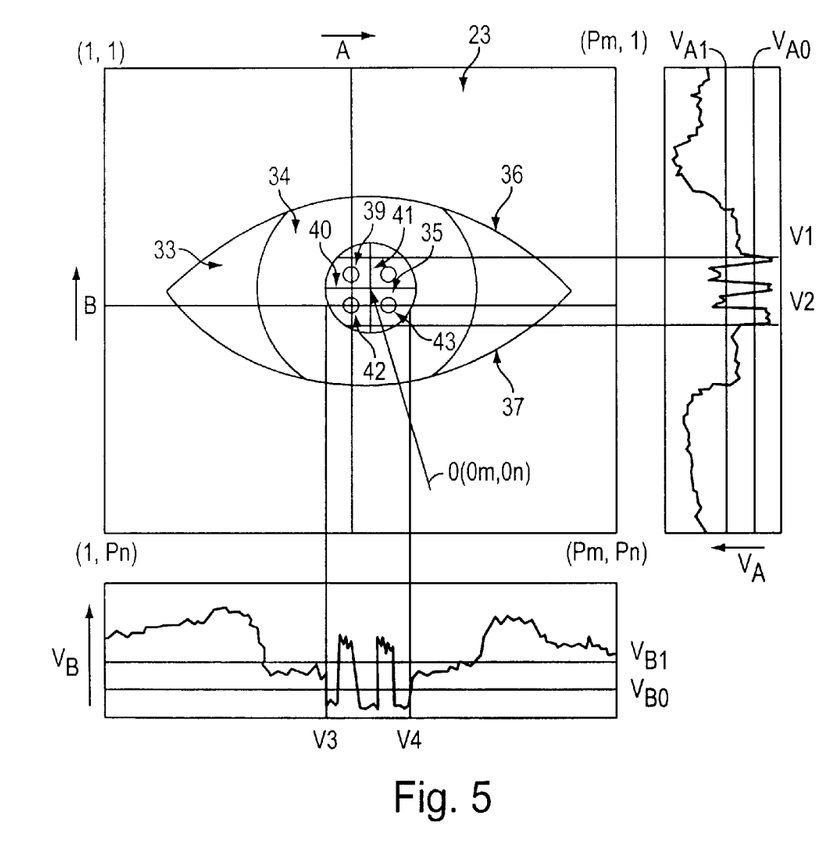
FIG. 5 is a view illustrating the theory of pupil reflection point detection.

FIG. 5 is a view illustrating the theory of the detection of the pupil reflection points. FIG. 5 has many parts in common with FIG. 3 and the same numerals are therefore given to portions of the configuration described in FIG. 3 and descriptions thereof are omitted.

In FIG. 5, numeral 39 indicates a reflection point and numerals 40 to 43 are reflection point detection regions. VA1 and VB1 are contrast voltage threshold values.

The authenticity determination processor 28 first sets the regions of the image data for the eye for which biogenic response characteristics are to be extracted (characteristic detection range setting). As the number of reflection points is taken as the biogenic response characteristics, the authenticity determination processor 28 sets the region within the pupil outline where reflection points exist as the characteristic detection range.

Next, the authenticity determination processor 28 divides the characteristic detection range into regions reflecting light from each light source of the near infrared light sources 13 taking the coordinates (Om, On) for the center O of the pupil outline as a reference in such a manner as to identify which of the light sources of the near infrared light sources 13 are lit and which are not (reflection point detection region settings).

The authenticity determination processor 28 scans the top of the image along the line A–A' and the line B–B' in the direction of the arrow. The authenticity determination processor 28 then sees portions where the contrast voltage VA is greater than the threshold value VA1 and where the contrast voltage VB is greater than the threshold value VB1 as reflection points (reflection point detection).

The authenticity determination processor 28 then determines which reflection point corresponds to which light source of the near infrared light sources 13 using the position of the reflection points (reflection point position determination). At this time, the size of the pupil outline changes depending on the amount of light from the visible light source 12 but the position of the reflection points does not change. The authenticity determination processor 28 then determines the authenticity of the image data for the eye by detecting the ratio of the position of the reflection points with respect to the size of the diameter of the pupil outline (determination as to whether or not the body is a currently living thing) using these characteristics.

Next, the authenticity determination processor 28 generates the second code based on the position of the reflection points.

Figure 6:
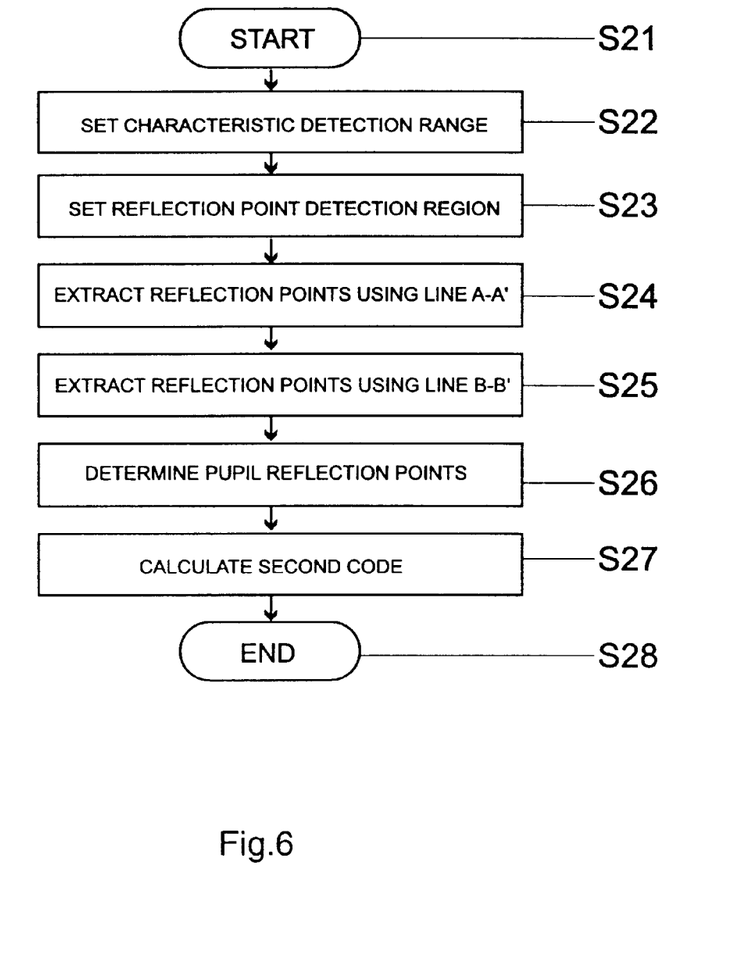
FIG. 6 is a flowchart relating to pupil reflection point detection.

FIG. 6 is a flowchart relating to the pupil reflection point detection described above.

In step S21, the authenticity determination processor 28 commences pupil reflection point detection if the detection of the pupil outline for the image data of the eye of the subject is finished.

In step S22, the authenticity determination processor 28 sets the characteristic detection range.

In step S23, the authenticity determination processor 28 sets the reflection point detection region.

In step S24, the authenticity determination processor 28 detects the reflection points using the line A–A'.

In step S25, the authenticity determination processor 28 detects the reflection points using the line B–B'.

In step S26, the authenticity determination processor 28 determines the position of the reflection points.

In step S27, the authenticity determination processor 28 calculates the second code.

In step S28, the authenticity determination processor 28 completes the pupil outline detection operation.

"Detection of the Number of Frames"

Figure 8:
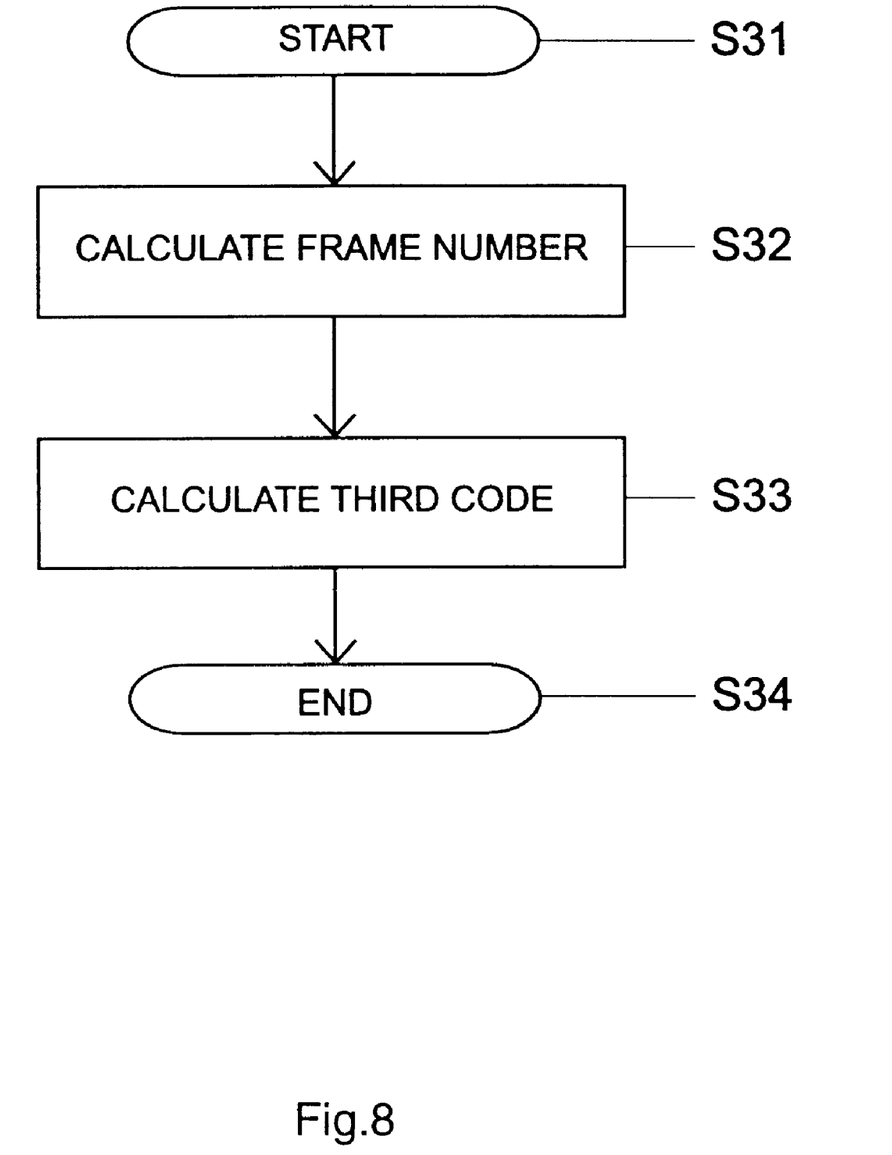
FIG. 8 is a flowchart relating to detecting the number of frames.

FIG. 8 is a flowchart relating to detection of the number of frames.

In step S31, the authenticity determination processor 28 starts to detect the number of frames.

The authenticity determination processor 28 calculates the number of frames received by the iris image processing section 19 from the iris image input section 18 (step S32), regards this number as the third code (step S33), and ends detection of the number of frames (step S34).

"Effects of the Invention"

The invention described above has the following effects.

The present invention can sense whether or not the image of an eye is inputted into a legitimate system in real-time by the subject or whether or not the image is inputted by illegal means, i.e. the present invention can determine whether or not an image of an eye inputted to the system is genuine or fake. Further, the system can determine whether or not components configuring the system are legitimate or illegal. As a result, it is possible to prevent crimes from being committed by a third party pretending to be another person.

What is claimed is:

1. An iris code generating device for generating an iris code from an image of an eye, comprising:
   a camera for photographing an image of an eye;
   an iris image processor for generating an iris code from the image of the eye photographed by the camera;
   a stimulation unit for causing a biogenic response in an eye of a subject;
   a processing section for extracting characteristics of the biogenic response caused by the stimulation unit from images of the eye photographed by the camera; and
   a life check controller randomly generating a first code for controlling operation of the stimulation unit using a predecided pattern, wherein the processing section calculates a second code from the characteristics of the biogenic response and compares the second code to the first code.

2. The iris code generating device of claim 1, further comprising means for encrypting the first code.

3. An iris code generating device for generating an iris code from an image of an eye, comprising:
   a camera for photographing an image of an eye;
   an iris image processor for generating an iris code from the image of the eye photographed by the camera;
   a stimulation unit for causing a biogenic response in an eye of a subject;

a processing section for extracting characteristics of the biogenic response caused by the stimulation unit from images of the eye photographed by the camera; and a life check controller for generating at least one first code for controlling operation of the stimulation unit using a predecided pattern, the life check controller supplying the at least one first code to the stimulation unit for operating the stimulation unit and supplying the at least one first code to the processing section, the processing section calculating at least one second code based on the characteristics of the biogenic response caused by the stimulation unit and extracted from the images of the eye photographed by the camera, the processing station comparing the at least one second code and the at least one first code.

4. The iris code generating device of claim 3, wherein the at least one first code supplied by the life check controller is a plurality of first codes, each of the plurality of first codes being different from one another, the stimulation unit operating based on the plurality of the first codes, and wherein the at least one second code calculated by the processing section is a plurality of second codes, the processing section calculating the plurality of second codes based on the characteristics of the biogenic response caused by the stimulation unit and extracted from the images of the eye photographed by the camera, the processing section comparing the plurality of second codes with the plurality of first codes.

5. The iris code generating device of claim 3, wherein the stimulation unit comprises a light source for generating visible light, with an amount of visible light generated by the light source being controlled by the life check controller.

6. The iris code generating device of claim 5, wherein the processing section measures the diameter of the pupil from the image of the eye photographed by the camera and calculates an amount of light for the light source generating visible light depending upon the diameter of the pupil.

7. The iris code generating device of claim 3, wherein the stimulation unit comprises one or more light sources for generating near infrared light, with illumination of the one or more light sources for generating near infrared light being selectively controlled by the life check controller.

8. The iris code generating device of claim 7, wherein reflected light is detected from the image of the eye photographed by the camera and states of illumination of the one or more light sources generating near infrared light is identified by the position of the reflected light.

9. The iris code generating device of claim 3, wherein the stimulation unit comprises a light source for generating visible light and one or more light sources for generating near infrared light, with an amount of light from the light source for generating visible light controlled by the life check controller and illumination of the one or more light sources for generating the near infrared light being selectively controlled by the life check controller.

10. The iris code generating device of claim 9, wherein the processing section measures the diameter of the pupil from the image of the eye photographed by the camera 4 and calculates an amount of light coming from the light source for generating the visible light depending on the size of the diameter of the pupil, detects reflected light from the image of the eye photographed by the camera 4, and identifies illumination conditions of the one or more light sources generating the near infrared light depending on the position of the reflected light.

* * * * *